US012654764B2

(12) United States Patent
Kimura et al.

(10) Patent No.: US 12,654,764 B2
(45) Date of Patent: Jun. 16, 2026

(54) STEERING CONTROL DEVICE AND ELECTRIC POWER STEERING DEVICE

(71) Applicant: Mitsubishi Electric Corporation, Tokyo (JP)

(72) Inventors: Mitsuharu Kimura, Tokyo (JP); Taizo Toda, Tokyo (JP); Masaki Matsushita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 77 days.

(21) Appl. No.: 18/853,952

(22) PCT Filed: Apr. 22, 2022

(86) PCT No.: PCT/JP2022/018546
§ 371 (c)(1),
(2) Date: Oct. 3, 2024

(87) PCT Pub. No.: WO2023/203751
PCT Pub. Date: Oct. 26, 2023

(65) Prior Publication Data
US 2025/0222977 A1     Jul. 10, 2025

(51) Int. Cl.
B62D 5/04          (2006.01)
(52) U.S. Cl.
CPC .................................. B62D 5/0463 (2013.01)
(58) Field of Classification Search
CPC ..... B62D 5/0463; B62D 5/0466; B62D 6/008
See application file for complete search history.

(56) References Cited

U.S. PATENT DOCUMENTS

| | | | | |
|---|---|---|---|---|
| 8,116,945 | B2 * | 2/2012 | Nozawa | B62D 5/0472 |
| | | | | 180/443 |
| 9,359,006 | B2 * | 6/2016 | Kodera | B62D 5/0463 |
| 10,173,725 | B2 * | 1/2019 | Heo | B62D 15/021 |
| 2009/0192665 | A1 * | 7/2009 | Nozawa | B62D 5/0487 |
| | | | | 701/31.4 |
| 2010/0286870 | A1 * | 11/2010 | Endo | B62D 5/046 |
| | | | | 701/41 |

(Continued)

FOREIGN PATENT DOCUMENTS

| | | |
|---|---|---|
| JP | 4026393 B2 | 12/2007 |
| JP | 6129409 B2 | 5/2017 |

*Primary Examiner* — Long T Tran
(74) *Attorney, Agent, or Firm* — Sughrue Mion, PLLC

(57) ABSTRACT

A steering control device includes: a target steering torque setting circuitry; a calculation circuitry; and a current drive circuitry. The target steering torque setting circuitry includes a first torque calculation circuitry configured to calculate a first shift amount by multiplying a rotation angular velocity of the motor by a steering angle gain, and to obtain a first torque based on a post-shift steering angle obtained by adding the first shift amount to the steering angle and a base map showing a characteristic of gradually increasing a base torque with the post-shift steering angle, a second torque calculation circuitry configured to obtain a second torque for imparting hysteresis to the target steering torque by using the rotation angular velocity of the motor, and a target steering torque calculation circuitry configured to add the first torque and the second torque to be output as the target steering torque.

12 Claims, 14 Drawing Sheets

(56) References Cited

U.S. PATENT DOCUMENTS

| | | | |
|---|---|---|---|
| 2014/0058630 A1* | 2/2014 | Kezobo | B62D 5/0463 |
| | | | 701/42 |
| 2014/0149000 A1* | 5/2014 | Tamura | B62D 5/0463 |
| | | | 701/42 |
| 2017/0015351 A1* | 1/2017 | Endo | B62D 6/00 |
| 2017/0080970 A1 | 3/2017 | Kenzobo et al. | |
| 2017/0282966 A1* | 10/2017 | Fukuda | B62D 5/046 |
| 2019/0367079 A1* | 12/2019 | Kodera | B62D 6/002 |
| 2020/0369316 A1* | 11/2020 | Tsubaki | B62D 5/0493 |
| 2020/0377148 A1* | 12/2020 | Nakade | B62D 15/025 |
| 2020/0403543 A1* | 12/2020 | Imamura | B62D 5/0484 |

* cited by examiner

Figure 3:
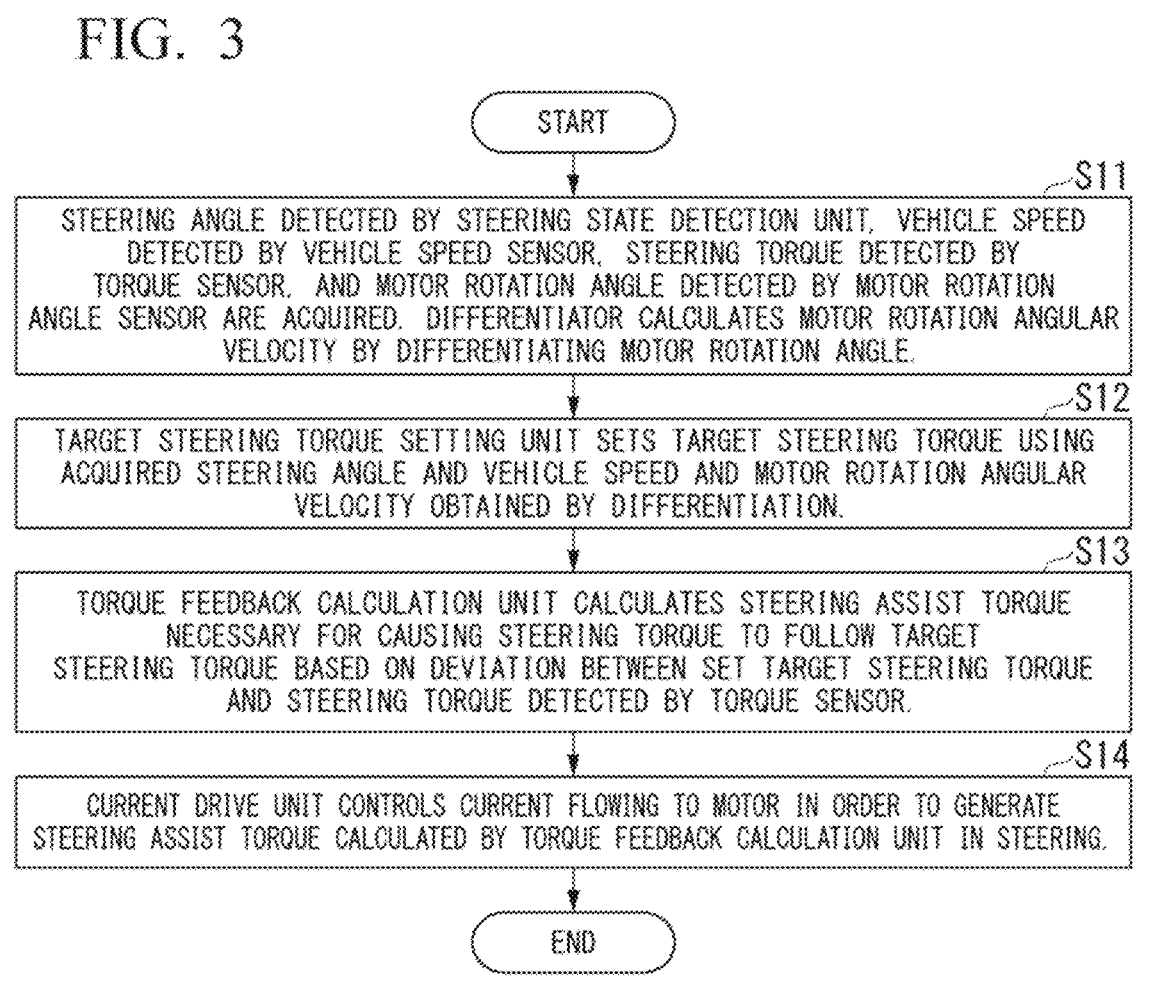

```
          ┌─────────────┐
          │    START    │
          └─────────────┘
                 │
                 ▼                                            ┌─S11
┌──────────────────────────────────────────────────────────────┐
│  STEERING ANGLE DETECTED BY STEERING STATE DETECTION UNIT,     │
│  VEHICLE SPEED DETECTED BY VEHICLE SPEED SENSOR, STEERING      │
│  TORQUE DETECTED BY TORQUE SENSOR, AND MOTOR ROTATION ANGLE    │
│  DETECTED BY MOTOR ROTATION ANGLE SENSOR ARE ACQUIRED.         │
│  DIFFERENTIATOR CALCULATES MOTOR ROTATION ANGULAR VELOCITY     │
│  BY DIFFERENTIATING MOTOR ROTATION ANGLE.                      │
└──────────────────────────────────────────────────────────────┘
                 │
                 ▼                                            ┌─S12
┌──────────────────────────────────────────────────────────────┐
│  TARGET STEERING TORQUE SETTING UNIT SETS TARGET STEERING      │
│  TORQUE USING ACQUIRED STEERING ANGLE AND VEHICLE SPEED AND    │
│  MOTOR ROTATION ANGULAR VELOCITY OBTAINED BY DIFFERENTIATION.  │
└──────────────────────────────────────────────────────────────┘
                 │
                 ▼                                            ┌─S13
┌──────────────────────────────────────────────────────────────┐
│  TORQUE FEEDBACK CALCULATION UNIT CALCULATES STEERING ASSIST   │
│  TORQUE NECESSARY FOR CAUSING STEERING TORQUE TO FOLLOW        │
│  TARGET STEERING TORQUE BASED ON DEVIATION BETWEEN SET TARGET  │
│  STEERING TORQUE AND STEERING TORQUE DETECTED BY TORQUE        │
│  SENSOR.                                                       │
└──────────────────────────────────────────────────────────────┘
                 │
                 ▼                                            ┌─S14
┌──────────────────────────────────────────────────────────────┐
│  CURRENT DRIVE UNIT CONTROLS CURRENT FLOWING TO MOTOR IN       │
│  ORDER TO GENERATE STEERING ASSIST TORQUE CALCULATED BY        │
│  TORQUE FEEDBACK CALCULATION UNIT IN STEERING.                 │
└──────────────────────────────────────────────────────────────┘
                 │
                 ▼
          ┌─────────────┐
          │     END     │
          └─────────────┘
```

FIG. 4

FIG. 8
FIG. 9A
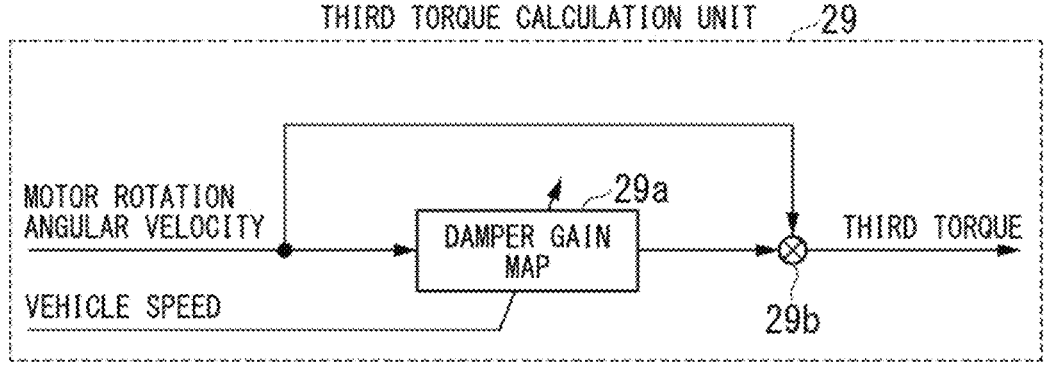
FIG. 9B
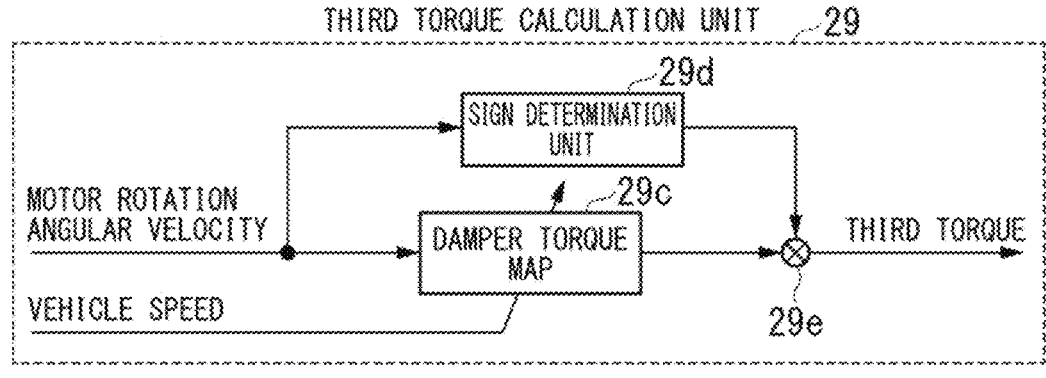

DAMPER GAIN MAP

DAMPER TORQUE MAP

FIG. 11

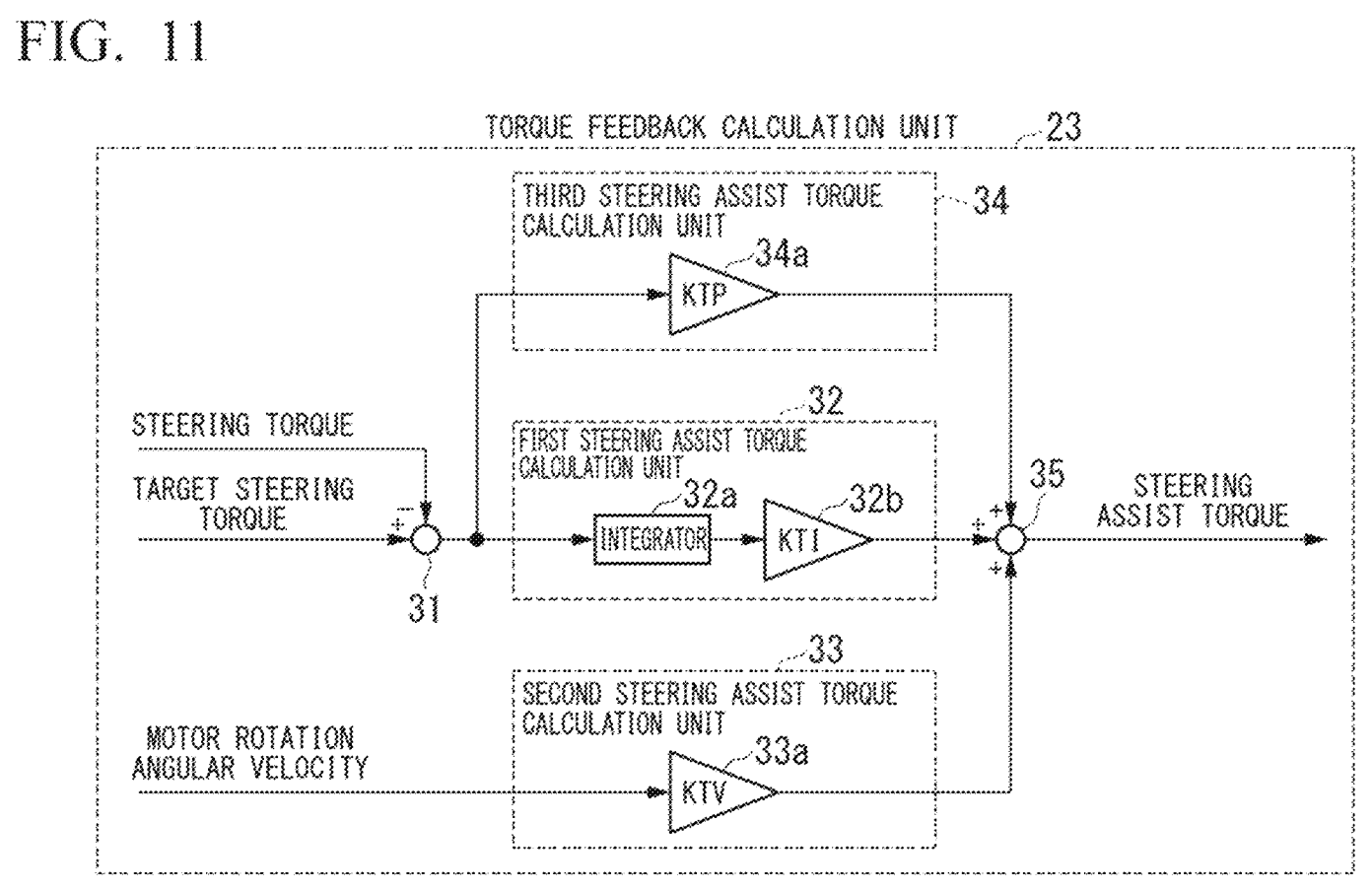

TORQUE FEEDBACK CALCULATION UNIT 23

THIRD STEERING ASSIST TORQUE CALCULATION UNIT 34

KTP 34a

FIRST STEERING ASSIST TORQUE CALCULATION UNIT 32

INTEGRATOR 32a

KTI 32b

SECOND STEERING ASSIST TORQUE CALCULATION UNIT 33

KTV 33a

35

STEERING ASSIST TORQUE

STEERING TORQUE

TARGET STEERING TORQUE

31

MOTOR ROTATION ANGULAR VELOCITY

STEERING CONTROL DEVICE AND ELECTRIC POWER STEERING DEVICE

CROSS REFERENCE TO RELATED APPLICATIONS

This application is a National Stage of International Application No. PCT/JP2022/018546 filed Apr. 22, 2022.

TECHNICAL FIELD

The present disclosure relates to a steering control device and an electric power steering device.

BACKGROUND ART

An electric power steering device includes a motor that generates a steering assist torque for steering, and a steering control device that controls the motor, and adds a steering assist force to a steering mechanism of a vehicle such as an automobile. Such an electric power steering device has an advantage of being lighter and more compact compared to a hydraulic power steering device.

Patent Document 1 below discloses an electric power steering device that is not affected by a change in mechanism characteristics due to road surface conditions or deterioration with age of a steering mechanism and can obtain a constant steering feeling. In this electric power steering device, by setting a characteristic of a steering force relative to a steering angle (hereinafter, referred to as a "steering force-angle characteristic") to be a desired steering force characteristic (target steering force-angle characteristic), a constant steering feeling is obtained.

CITATION LIST

Patent Document

[Patent Document 1]
Japanese Patent No. 6129409

SUMMARY OF INVENTION

Problem to be Solved by the Invention

Meanwhile, in the electric power steering device disclosed in Patent Document 1 described above, a target steering force is calculated using a steering force characteristics model including a spring component, a viscosity component, and a friction component. On the other hand, in order to adjust an on-center feeling near a steering neutral position, it is necessary to increase or decrease the viscosity component (damper torque) or the friction component (friction torque). Here, since the viscosity component or the friction component is adjusted for purposes other than the on-center feeling, there is a problem in that changing the viscosity component or the friction component for the adjustment of the on-center feeling disrupts a steering feeling that has already been set.

The present disclosure has been made in view of the above circumstances, and an object of the present disclosure is to provide a steering control device and an electric power steering device capable of adjusting an on-center feeling with a simple configuration while suppressing an influence on a steering feeling that has already been set.

Means to Solve the Problem

In order to solve the above problem, a steering control device according to an aspect of the present disclosure includes: a target steering torque setting unit configured to set a target steering torque for steering; a calculation unit configured to calculate, based on a deviation between the target steering torque and a steering torque acting on a steering shaft of the steering, a steering assist torque necessary for causing the steering torque to follow the target steering torque; and a current drive unit configured to control a current flowing to a motor to generate the steering assist torque for the steering, in which the target steering torque setting unit includes a first torque calculation unit configured to calculate a first shift amount, which is a shift amount of a steering angle of a steering wheel, by multiplying a rotation angular velocity of the motor by a steering angle gain, and to obtain a first torque based on a post-shift steering angle obtained by adding the first shift amount to the steering angle and a base map showing a characteristic of gradually increasing a magnitude of a base torque as a magnitude of the post-shift steering angle increases, a second torque calculation unit configured to obtain a second torque for imparting hysteresis to the target steering torque by using the rotation angular velocity of the motor, and a target steering torque calculation unit configured to add the first torque and the second torque to be output as the target steering torque.

In addition, an electric power steering device according to another aspect of the present disclosure includes: a steering torque detection unit configured to detect a steering torque acting on a steering shaft of steering; a steering state detection unit configured to detect a steering angle of a steering wheel; a motor configured to apply a steering assist torque to the steering shaft; a motor rotation angular velocity detection unit configured to detect a rotation angular velocity of the motor; and the above-described steering control device configured to control drive of the motor based on the detected steering torque, the detected steering angle, and the detected rotation angular velocity of the motor.

Effects of the Invention

According to the present disclosure, an on-center feeling can be adjusted with a simple configuration while suppressing an influence on a steering feeling that has been already set.

BRIEF DESCRIPTION OF DRAWINGS

FIG. 2 is a block diagram showing a configuration of a main part of a control unit as a steering control device according to the first embodiment of the present disclosure.

FIG. 3 is a flowchart showing an outline of an operation of the control unit as the steering control device according to the first embodiment of the present disclosure.

FIG. 4 is a block diagram showing an example of an internal configuration of a target steering torque setting unit in the first embodiment of the present disclosure.

FIG. 8 is a diagram showing an example of a hysteresis gain used in a second torque calculation unit in the first embodiment of the present disclosure.

FIG. 9A is a block diagram showing a configuration example of a third torque calculation unit in the first embodiment of the present disclosure.

FIG. 9B is a block diagram showing another configuration example of the third torque calculation unit in the first embodiment of the present disclosure.

FIG. 11 is a block diagram showing an example of an internal configuration of a torque feedback calculation unit in the first embodiment of the present disclosure.

FIG. 14 shows an operation trajectory of the steering angle in a case where a driver releases the steering wheel after cutting in.

DESCRIPTION OF EMBODIMENTS

Figure 1:
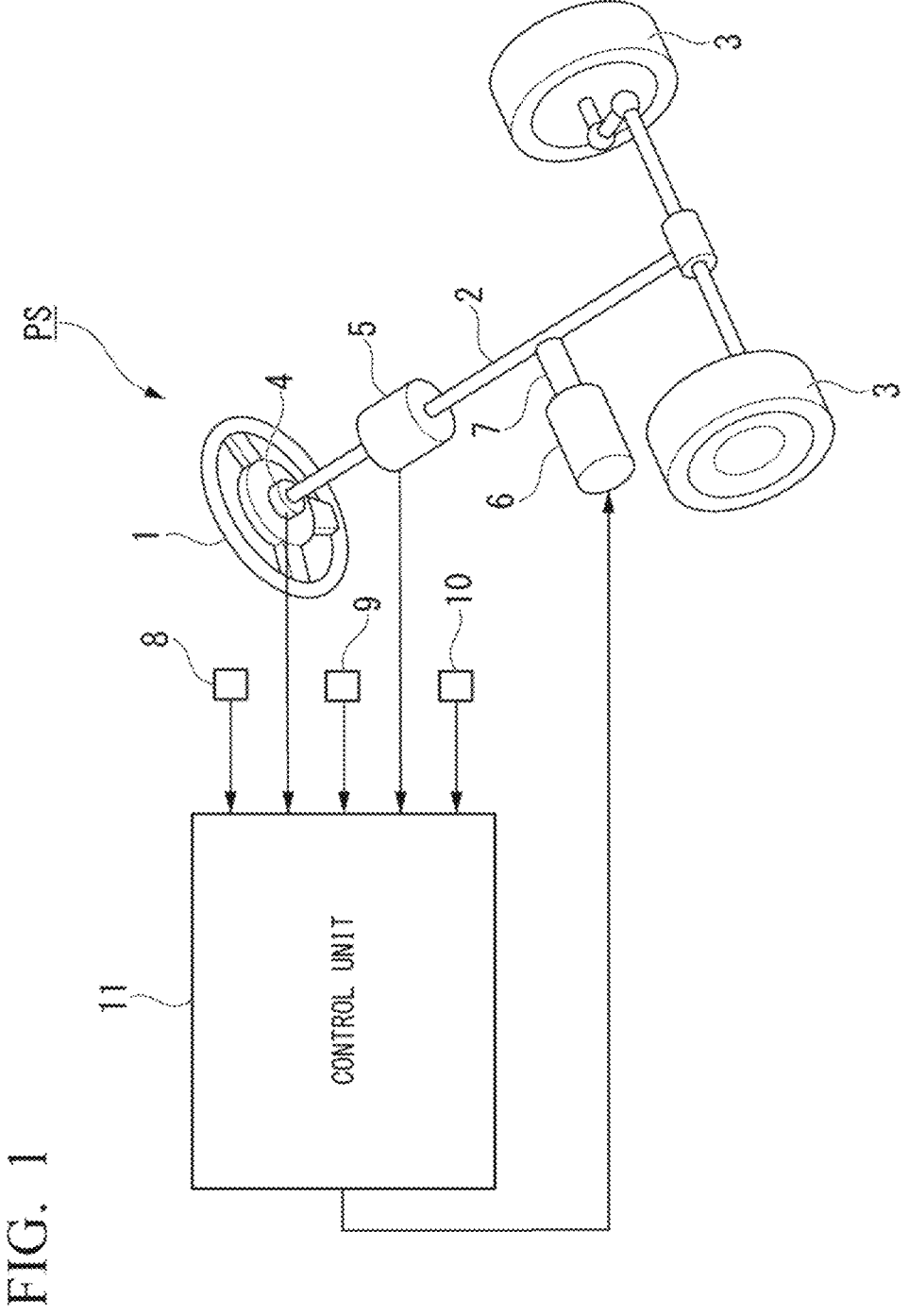
FIG. 1 is a block diagram showing a configuration of a main part of an electric power steering device according to a first embodiment of the present disclosure.

Hereinafter, a steering control device and an electric power steering device according to embodiments of the present disclosure will be described in detail with reference to the drawings. In each of the embodiment, the same or corresponding portions are denoted by the same reference numerals, and description of overlapping portions will be omitted.

First Embodiment

<Electric Power Steering Device>

FIG. 1 is a block diagram showing a configuration of a main part of an electric power steering device according to a first embodiment of the present disclosure. As shown in FIG. 1, an electric power steering device PS according to the present embodiment includes a steering wheel 1, a steering shaft 2, turning wheels 3, a steering angle sensor 4, a torque sensor 5 (steering torque detection unit), a motor 6, a reduction gear 7, a vehicle speed sensor 8, a current sensor 9, a motor rotation angle sensor 10, and a control unit 11 (steering control device).

The steering wheel 1 is a so-called handle, and is operated by a driver of a vehicle in order to provide a steering angle for the turning wheels 3 of the vehicle. The steering shaft 2 is connected to the steering wheel 1 and is rotated in response to the rotation of the steering wheel 1. The turning wheels 3 are provided on both left and right sides of the vehicle and are turned in response to the rotation of the steering shaft 2. It should be noted that a mechanism that includes the steering wheel 1 and the steering shaft 2 to turn the turning wheels 3 will be referred to as "steering".

The steering angle sensor 4 is disposed in the steering wheel 1 and detects a steering angle of the steering wheel 1. The torque sensor 5 is disposed on the steering shaft 2 and detects a steering torque acting on the steering shaft 2. The motor 6 is connected to the steering shaft 2 via the reduction gear 7, and applies a steering assist torque to the steering shaft 2. The vehicle speed sensor 8 detects a vehicle speed of the vehicle. The current sensor 9 detects a current flowing through the motor 6. The motor rotation angle sensor 10 detects a rotation angle of the motor 6.

The control unit 11 controls driving of the motor 6 based on detection results of the steering angle sensor 4, the torque sensor 5, the vehicle speed sensor 8, the current sensor 9, and the motor rotation angle sensor 10 to generate the steering assist torque for the steering. Specifically, the control unit 11 calculates the steering assist torque to be provided to the steering shaft 2 based on each of the above-described detection results and controls the current of the motor 6 necessary for generating the steering assist torque. Hereinafter, the control unit 11 will be described in detail.

<Steering Control Device>

Figure 2:
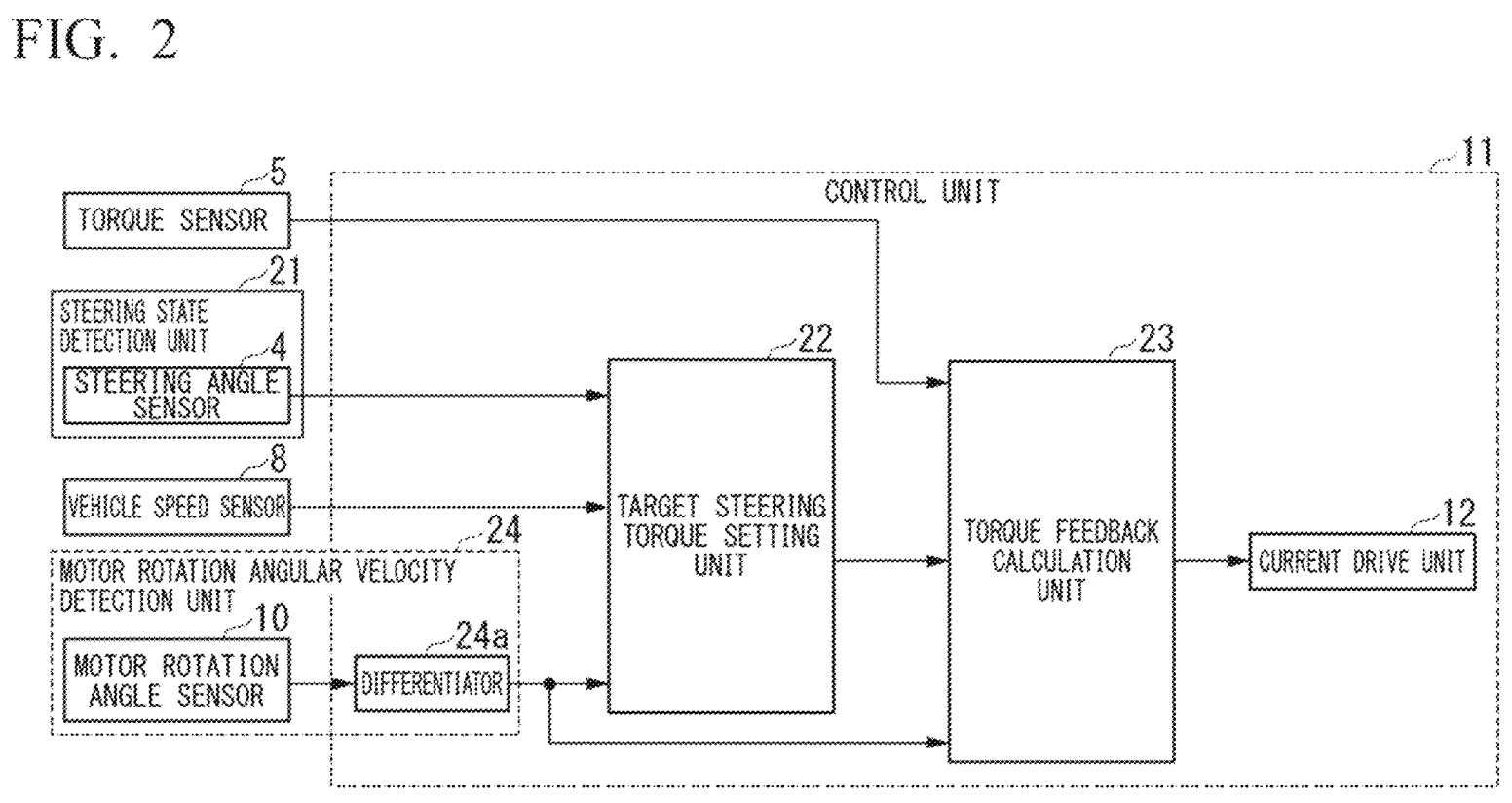

FIG. 2 is a block diagram showing a configuration of a main part of the control unit as the steering control device according to the first embodiment of the present disclosure. As shown in FIG. 2, the control unit 11 includes a differentiator 24a, a target steering torque setting unit 22, a torque feedback calculation unit 23 (calculation unit), and a current drive unit 12. The differentiator 24a differentiates the rotation angle of the motor 6 detected by the motor rotation angle sensor 10 to calculate a rotation angular velocity of the motor 6 (hereinafter, referred to as a "motor rotation angular velocity"). The differentiator 24a and the motor rotation angle sensor 10 constitute a motor rotation angular velocity detection unit 24 that detects the motor rotation angular velocity.

The target steering torque setting unit 22 sets a target steering torque for the steering. Here, the target steering torque setting unit 22 receives, as inputs, the steering angle of the steering wheel 1 detected by a steering state detection unit 21 including the steering angle sensor 4, the vehicle speed of the vehicle detected by the vehicle speed sensor 8, and the motor rotation angular velocity detected by the motor rotation angular velocity detection unit 24. The target steering torque setting unit 22 sets the target steering torque for the steering by using these detection results. The details of the target steering torque setting unit 22 will be described later.

The torque feedback calculation unit 23 calculates the steering assist torque necessary for causing the steering torque to follow the target steering torque based on a deviation between the target steering torque set by the target steering torque setting unit 22 and the steering torque detected by the torque sensor 5. The current drive unit 12 controls the current flowing to the motor 6 in order to generate the steering assist torque calculated by the torque feedback calculation unit 23 in the steering.

In addition, in the configuration of the control unit 11, a configuration excluding the current drive unit 12 (the differentiator 24a, the target steering torque setting unit 22, and the torque feedback calculation unit 23) is implemented by a microcomputer including a central processing unit (CPU) and a memory. The memory provided in the microcomputer may include both a volatile memory and a non-volatile memory. The current drive unit 12 is implemented by, for example, an analog circuit including a plurality of switching elements, such as a field-effect transistor (FET).

FIG. 3 is a flowchart showing an outline of an operation of the control unit as the steering control device according to the first embodiment of the present disclosure. It should be noted that processing of the flowchart shown in FIG. 3 is repeatedly performed in a predetermined control cycle. In a case where the processing is started, first, the control unit 11 acquires the steering angle detected by the steering state detection unit 21, the vehicle speed detected by the vehicle speed sensor 8, the steering torque detected by the torque sensor 5, and the motor rotation angle detected by the motor rotation angle sensor 10. Then, the differentiator 24a of the control unit 11 differentiates the acquired motor rotation angle to obtain the motor rotation angular velocity (step S11).

Next, the target steering torque setting unit 22 of the control unit 11 sets the target steering torque using the acquired steering angle and vehicle speed and the motor rotation angular velocity obtained by differentiation (step S12). Then, the torque feedback calculation unit 23 of the control unit 11 calculates the steering assist torque necessary for causing the steering torque to follow the target steering torque based on the deviation between the target steering torque set by the target steering torque setting unit 22 and the steering torque detected by the torque sensor 5 (step S13). Subsequently, the current drive unit 12 of the control unit 11 controls the current flowing to the motor 6 in order to generate the steering assist torque calculated by the torque feedback calculation unit 23 in the steering (step S14).

Figure 4:
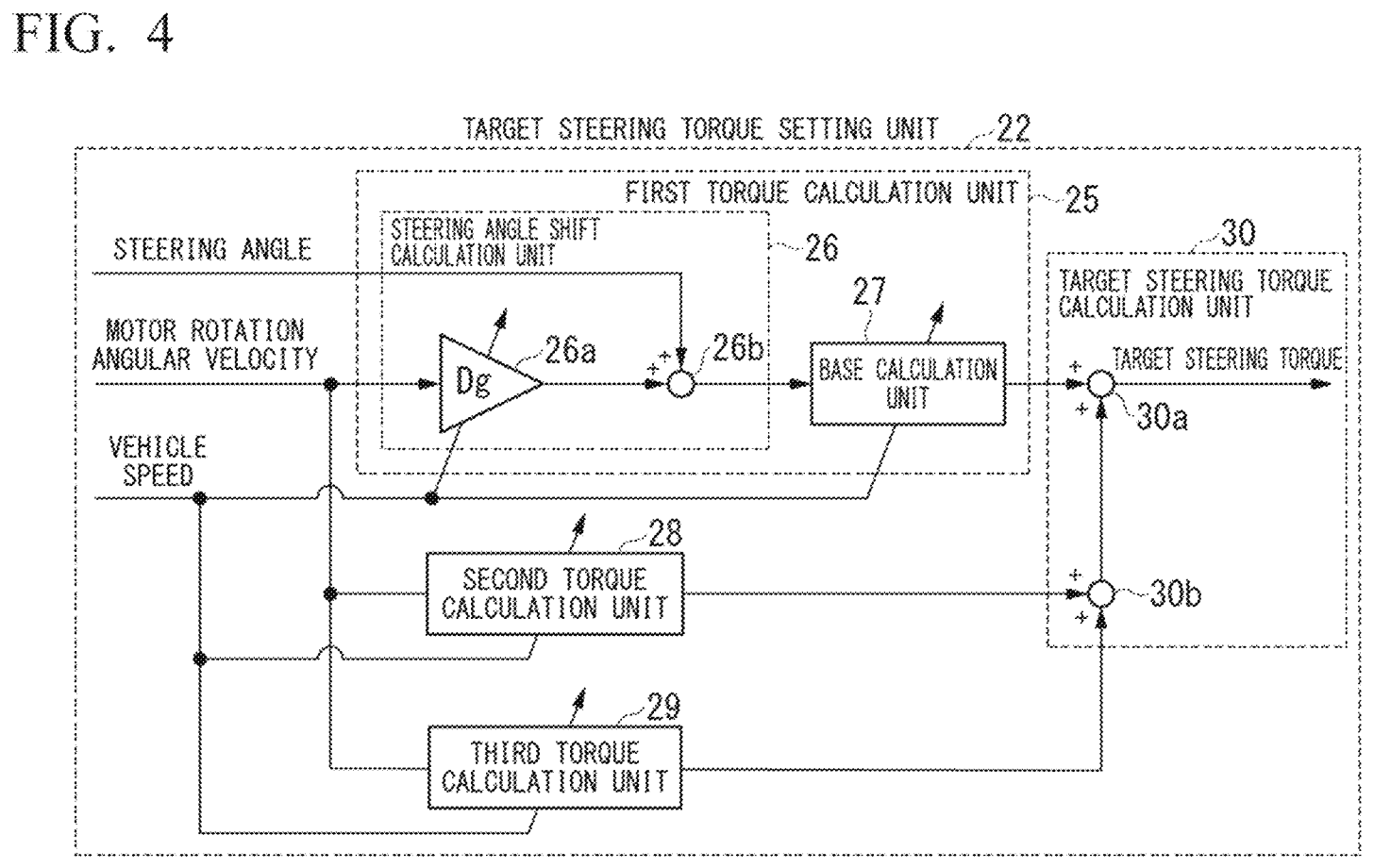

FIG. 4 is a block diagram showing an example of an internal configuration of the target steering torque setting unit in the first embodiment of the present disclosure. As shown in FIG. 4, the target steering torque setting unit 22 includes a first torque calculation unit 25, a second torque calculation unit 28, a third torque calculation unit 29, and a target steering torque calculation unit 30.

The first torque calculation unit 25 includes a steering angle shift calculation unit 26 and a base calculation unit 27, and obtains a first torque, which is a base torque, using the steering angle, the motor rotation angular velocity, and the vehicle speed. The steering angle shift calculation unit 26 includes a multiplier 26a and an adder 26b to obtain a post-shift steering angle. The multiplier 26a calculates a first shift amount, which is a shift amount of the steering angle of the steering wheel 1, by multiplying the motor rotation angular velocity by a steering angle shift gain Dg (steering angle gain). The adder 26b adds the first shift amount to the steering angle to obtain the post-shift steering angle. The base calculation unit 27 obtains the first torque based on the post-shift steering angle obtained by the steering angle shift calculation unit 26 and a base map indicating a characteristic of gradually increasing a magnitude of the base torque as a magnitude of the post-shift steering angle increases.

Figure 5:
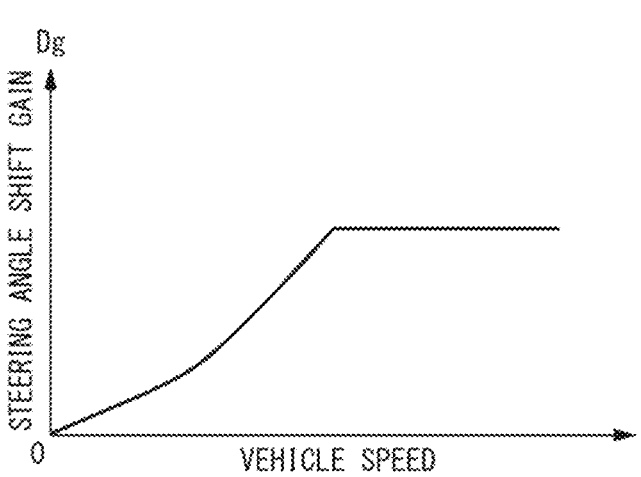
FIG. 5 is a diagram showing an example of a steering angle shift gain used in a first torque calculation unit in the first embodiment of the present disclosure.

FIG. 5 is a diagram showing an example of the steering angle shift gain used in the first torque calculation unit in the first embodiment of the present disclosure. The steering angle shift gain Dg shown in FIG. 5 is a value that gradually increases as the vehicle speed increases up to a certain vehicle speed, but the value becomes constant beyond the certain vehicle speed. In a case where such a steering angle shift gain Dg is used, the steering angle shift gain Dg is changed according to the vehicle speed in the first torque calculation unit 25. The steering angle shift gain Dg shown in FIG. 5 is changed in value according to the vehicle speed, but may not be changed in value regardless of the vehicle speed.

Figure 6A:
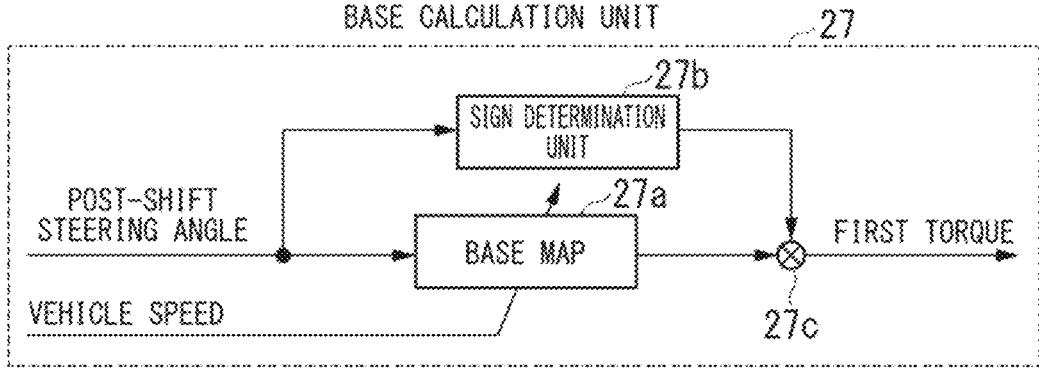
FIG. 6A is a block diagram showing a configuration example of a base calculation unit provided in the first torque calculation unit in the first embodiment of the present disclosure.
Figure 7A:
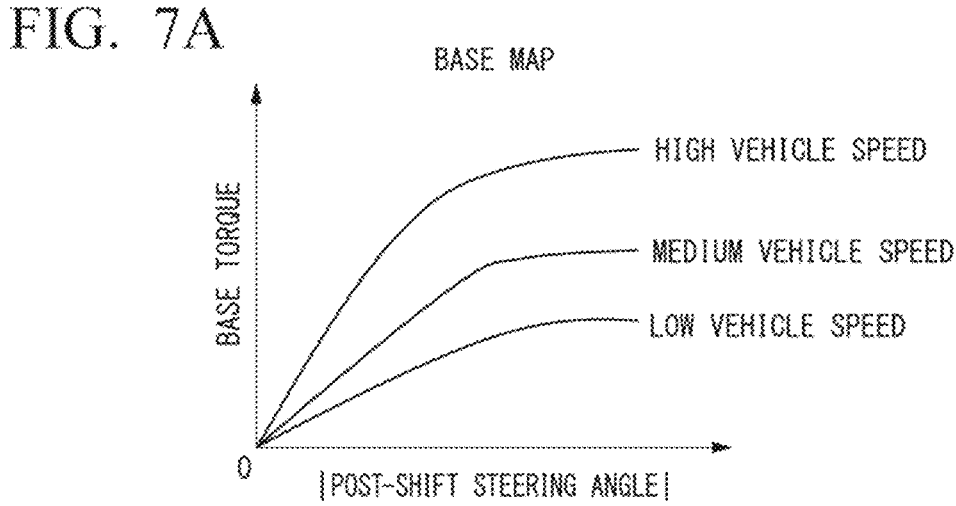
FIG. 7A is a diagram showing an example of a base map used in the base calculation unit shown in FIG. 6A.

FIG. 6A is a block diagram showing a configuration example of the base calculation unit provided in the first torque calculation unit in the first embodiment of the present disclosure. The base calculation unit 27 shown in FIG. 6A includes a base map 27a, a sign determination unit 27b, and a multiplier 27c. The base map 27a is a map in which the base torque is defined according to the post-shift steering angle. FIG. 7A is a diagram showing an example of the base map used in the base calculation unit shown in FIG. 6A. The base map 27a shown in FIG. 7A has a characteristic of gradually increasing a magnitude of the base torque in a positive direction as the magnitude (absolute value) of the post-shift steering angle increases.

In addition, the base map 27a is prepared to be different for each vehicle speed. In the example shown in FIG. 7A, different base maps 27a are prepared for each of "low vehicle speed", "medium vehicle speed", and "high vehicle speed". In a case where the base map 27a is prepared, the base map 27a in the first torque calculation unit 25 is changed according to the vehicle speed. However, the base map 27a does not necessarily need to be prepared to be different for each vehicle speed. The sign determination unit 27b determines whether a sign of the post-shift steering angle is positive (+1) or negative (−1). The multiplier 27c multiplies the magnitude of the base torque obtained by using the base map 27a and the sign determined by the sign determination unit 27b.

In the base calculation unit 27, one base map 27a is specified according to the input vehicle speed. The magnitude of the base torque (first torque) is obtained by using the post-shift steering angle input to the base calculation unit 27 and the specified base map 27a. In addition, the sign of the input post-shift steering angle is determined by the sign determination unit 27b. Then, the magnitude of the base torque (first torque) obtained by using the base map 27a and the sign of the post-shift steering angle determined by the sign determination unit 27b are multiplied by the multiplier 27c, whereby the base torque (first torque) is obtained.

Figure 6B:
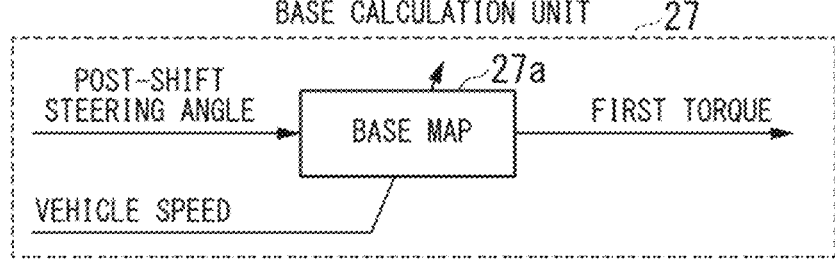
FIG. 6B is a block diagram showing another configuration example of the base calculation unit provided in the first torque calculation unit in the first embodiment of the present disclosure.
Figure 7B:
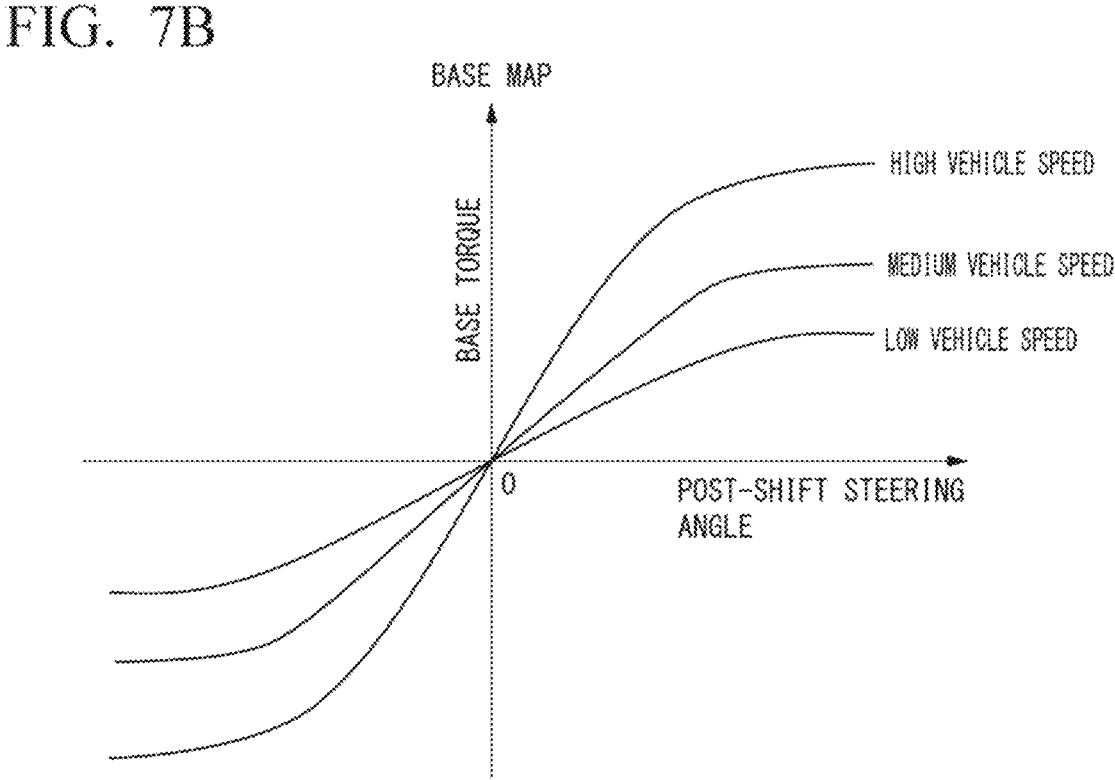
FIG. 7B is a diagram showing an example of the base map used in the base calculation unit shown in FIG. 6B.

FIG. 6B is a block diagram showing another configuration example of the base calculation unit provided in the first torque calculation unit in the first embodiment of the present disclosure. The base calculation unit 27 shown in FIG. 6B includes only the base map 27a. The base map 27a shown in FIG. 6B is a map in which the base torque is defined according to the post-shift steering angle as in the base map 27a shown in FIG. 6A. FIG. 7B is a diagram showing an example of the base map used in the base calculation unit shown in FIG. 6B.

The base map 27a shown in FIG. 6B has a characteristic of gradually increasing the magnitude of the base torque in the positive direction as the magnitude of the post-shift steering angle in the positive direction increases and gradually increasing the magnitude of the base torque in a negative direction as the magnitude of the post-shift steering angle in the negative direction increases, as shown in FIG. 7B. The base map 27*a* shown in FIG. 6B is also prepared to be different for each vehicle speed. In the example shown in FIG. 7B, as in the example shown in FIG. 7A, different base maps 27*a* are prepared for each of "low vehicle speed", "medium vehicle speed", and "high vehicle speed". In a case where the base map 27*a* is prepared, the base map 27*a* in the first torque calculation unit 25 is changed according to the vehicle speed. However, the base map 27*a* does not necessarily need to be prepared to be different for each vehicle speed.

In the base calculation unit 27, one base map 27*a* is specified according to the input vehicle speed. The base torque (first torque) is obtained by using the post-shift steering angle input to the base calculation unit 27 and the specified base map 27*a*.

The second torque calculation unit 28 obtains a second torque, which is a friction torque, based on the motor rotation angular velocity and the vehicle speed. In a case where the motor rotation angular velocity is denoted by $d\theta_m$ and a hysteresis gain is Tf, the second torque (friction torque) is represented by the following expression. As can be seen from the following expression, the second torque (friction torque) has a constant magnitude and is saturated as the motor rotation angular velocity $d\theta_m$ increases.

[Mathematical Expression 1]

$$\text{Second torque (friction torque)} = \text{sign} \ (d\theta_m) \cdot (1 - \exp(-\text{abs}(d\theta_m))) \cdot Tf$$

$$\text{sign} \ (d\theta_m) = \begin{cases} -1 \text{ if } \theta < 0 \\ 0 \text{ if } \theta = 0 \\ +1 \text{ if } \theta > 0 \end{cases}$$

FIG. 8 is a diagram showing an example of the hysteresis gain used in the second torque calculation unit in the first embodiment of the present disclosure. The hysteresis gain Tf shown in FIG. 8 is a value that gradually decreases as the vehicle speed increases up to a certain vehicle speed, but the value gradually increases as the vehicle speed increases beyond the certain vehicle speed. The hysteresis gain Tf shown in FIG. 8 is changed according to the vehicle speed, but may not be changed in value regardless of the vehicle speed.

In the second torque calculation unit 28, a low-pass filter process by a low-pass filter may be performed on the obtained second torque (friction torque). Here, a cutoff frequency of the low-pass filter is set to a value that can extract a frequency component set to include a steering frequency of the driver. In general, a limit steering frequency of the driver is about 5 [Hz], and a resonant frequency of the steering shaft 2 is around several tens of [Hz]. Therefore, the cutoff frequency is set to a value greater than 0 and equal to or less than 10 [Hz].

The third torque calculation unit 29 obtains a third torque, which is a damper torque, based on the motor rotation angular velocity and the vehicle speed.

Figure 10A:
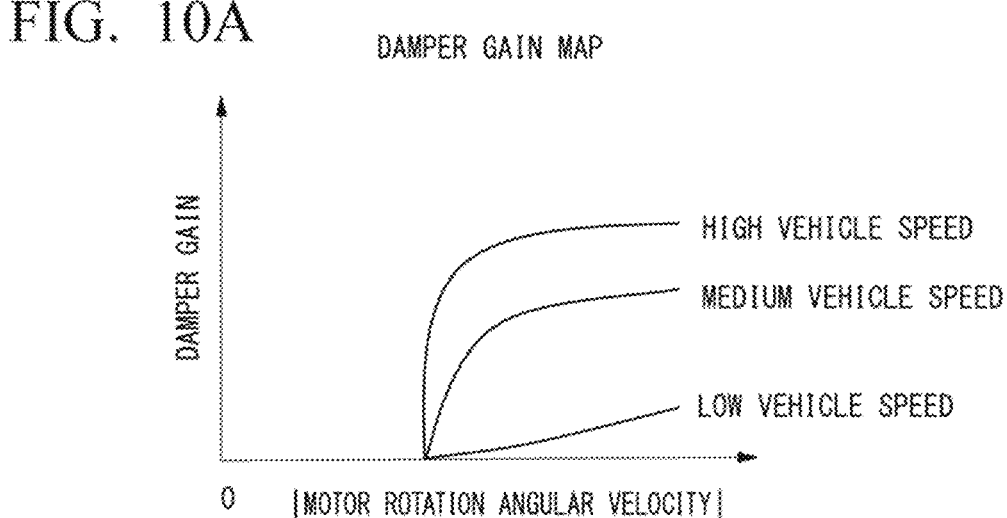
FIG. 10A is a diagram showing an example of a damper gain map used in the third torque calculation unit shown in FIG. 9A.

FIG. 9A is a block diagram showing a configuration example of the third torque calculation unit in the first embodiment of the present disclosure. The third torque calculation unit 29 shown in FIG. 9A includes a damper gain map 29*a* and a multiplier 29*b*. The damper gain map 29*a* is a map in which a damper gain is defined according to the motor rotation angular velocity. FIG. 10A is a diagram showing an example of the damper gain map used in the third torque calculation unit shown in FIG. 9A.

The damper gain map 29*a* shown in FIG. 10A has a characteristic of gradually increasing a magnitude of the damper gain as a magnitude (absolute value) of the motor rotation angular velocity increases when the magnitude (absolute value) of the motor rotation angular velocity exceeds a certain value. The magnitude of the damper gain is zero until the magnitude (absolute value) of the motor rotation angular velocity reaches a certain value.

In addition, the damper gain map 29*a* is prepared to be different for each vehicle speed. In the example shown in FIG. 10A, different damper gain maps 29*a* are prepared for each of "low vehicle speed", "medium vehicle speed", and "high vehicle speed". In a case where the damper gain map 29*a* is prepared, the damper gain map 29*a* in the third torque calculation unit 29 is changed according to the vehicle speed. However, the damper gain map 29*a* does not necessarily need to be prepared to be different for each vehicle speed. The multiplier 29*b* multiplies the motor rotation angular velocity by the damper gain obtained by using the damper gain map 29*a*.

In the third torque calculation unit 29, one damper gain map 29*a* is specified according to the input vehicle speed. The damper gain is obtained by using the motor rotation angular velocity input to the third torque calculation unit 29 and the specified damper gain map 29*a*. Then, the damper gain obtained by using the damper gain map 29*a* and the motor rotation angular velocity are multiplied by the multiplier 29*b*, whereby the damper torque (third torque) is obtained.

Figure 10B:
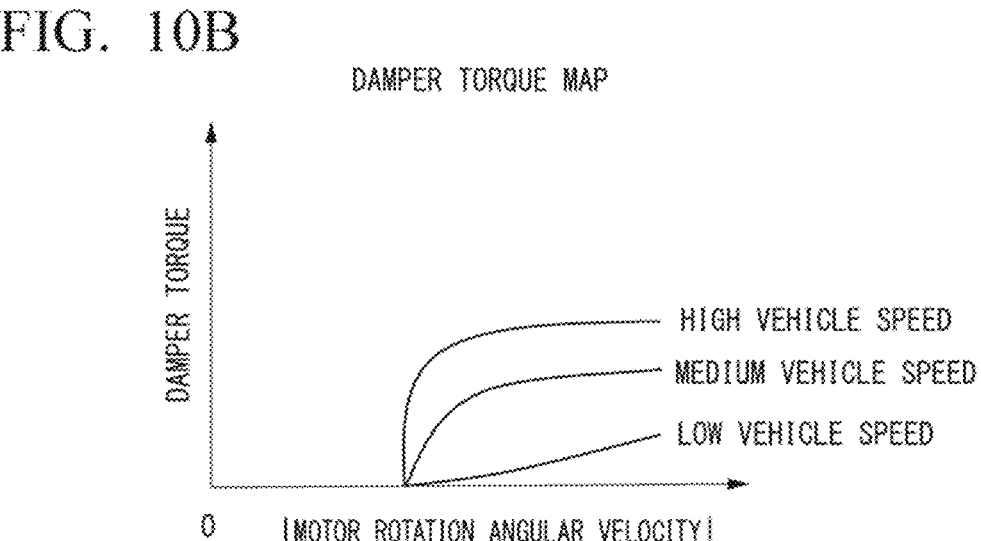
FIG. 10B is a diagram showing an example of a damper torque map used in the third torque calculation unit shown in FIG. 9B.

FIG. 9B is a block diagram showing another configuration example of the third torque calculation unit in the first embodiment of the present disclosure. The third torque calculation unit 29 shown in FIG. 9B includes a damper torque map 29*c*, a sign determination unit 29*d*, and a multiplier 29*e*. The damper torque map 29*c* is a map in which the damper torque is defined according to the motor rotation angular velocity. FIG. 10B is a diagram showing an example of the damper torque map used in the third torque calculation unit shown in FIG. 9B.

The damper torque map 29*c* shown in FIG. 10B has the same characteristic as the damper gain map 29*a* shown in FIG. 10A. That is, the damper torque map 29*c* shown in FIG. 10B has a characteristic of gradually increasing a magnitude of the damper torque as the magnitude (absolute value) of the motor rotation angular velocity increases when the magnitude (absolute value) of the motor rotation angular velocity exceeds a certain value. The magnitude of the damper torque is zero until the magnitude (absolute value) of the motor rotation angular velocity reaches a certain value.

In addition, the damper torque map 29*c* is prepared to be different for each vehicle speed. In the example shown in FIG. 10B, different damper torque maps 29*c* are prepared for each of "low vehicle speed", "medium vehicle speed", and "high vehicle speed". In a case where the damper torque map 29*c* is prepared, the damper torque map 29*c* in the third torque calculation unit 29 is changed according to the vehicle speed. However, the damper torque map 29*c* does not necessarily need to be prepared to be different for each vehicle speed. The sign determination unit 29*d* determines whether the sign of the motor rotation angular velocity is positive (+1) or negative (−1). The multiplier 29*e* multiplies the magnitude of the damper torque obtained by using the damper torque map 29*c* and the sign determined by the sign determination unit 29*d*.

In the third torque calculation unit 29, one damper torque map 29*c* is specified according to the input vehicle speed.

The magnitude of the damper torque (third torque) is obtained by using the motor rotation angular velocity input to the third torque calculation unit 29 and the specified damper torque map 29c. In addition, the sign of the input motor rotation angular velocity is determined by the sign determination unit 29d. Then, the magnitude of the damper torque (third torque) obtained by using the damper torque map 29c and the sign of the motor rotation angular velocity determined by the sign determination unit 29d are multiplied by the multiplier 29e, whereby the damper torque (third torque) is obtained.

The target steering torque calculation unit 30 includes adders 30a and 30b, and adds the base torque (first torque) calculated by the first torque calculation unit 25, the friction torque (second torque) calculated by the second torque calculation unit 28, and the damper torque (third torque) calculated by the third torque calculation unit 29. Specifically, the friction torque (second torque) and the damper torque (third torque) are added by the adder 30b, and the torque output from the adder 30b and the base torque (first torque) are added by the adder 30a. The target steering torque calculation unit 30 outputs the torque obtained by addition as the target steering torque.

FIG. 11 is a block diagram showing an example of an internal configuration of the torque feedback calculation unit in the first embodiment of the present disclosure. As shown in FIG. 11, the torque feedback calculation unit 23 includes a subtractor 31, a first steering assist torque calculation unit 32, a second steering assist torque calculation unit 33, a third steering assist torque calculation unit 34, and an adder 35. The torque feedback calculation unit 23 calculates the steering assist torque necessary for causing the steering torque to follow the target steering torque based on the deviation between the target steering torque set by the target steering torque setting unit 22 and the steering torque detected by the torque sensor 5.

The subtractor 31 obtains the deviation between the target steering torque set by the target steering torque setting unit 22 and the steering torque detected by the torque sensor 5. The first steering assist torque calculation unit 32 includes an integrator 32a and a multiplier 23b, and calculates a first steering assist torque by integrating the deviation obtained by the subtractor 31 by the integrator 32a and performing a calculation of multiplying the integrated deviation by an integral control gain KTI in the multiplier 32b.

The second steering assist torque calculation unit 33 includes a multiplier 33a, and calculates a second steering assist torque by performing a calculation of multiplying the motor rotation angular velocity by a speed control gain KTV in the multiplier 33a. The third steering assist torque calculation unit 34 includes a multiplier 34a, and calculates a third steering assist torque by performing a calculation of multiplying the deviation obtained by the subtractor 31 by a proportional control gain KTP in the multiplier 34a.

The adder 35 adds the first steering assist torque calculated by the first steering assist torque calculation unit 32, the second steering assist torque calculated by the second steering assist torque calculation unit 33, and the third steering assist torque calculated by the third steering assist torque calculation unit 34. The adder 35 then outputs the torque obtained by addition as the steering assist torque.

Here, since the steering assist torque includes an integral control component (first steering assist torque), the steering torque of the driver follows the target steering torque. Accordingly, the driver can steer the vehicle with an appropriate torque. In addition, in a case where the driver removes his/her hand from the steering wheel 1, the steering torque can be adjusted to a value between the target steering torque and zero by a motor speed control component (second steering assist torque) obtained by multiplying the motor rotation angular velocity by the speed control gain KTV. Accordingly, the steering torque follows the target steering torque, whereby smooth steering can be achieved. In addition, by using the motor speed control component (second steering assist torque), it is possible to secure control stability even in a case where positions of the motor 6 and the torque sensor 5 are distant from each other. Furthermore, since the differentiation of the target steering torque is not necessary, it is possible to suppress noise, and it is possible to achieve smooth and stable steering.

A steering assist torque proportional control component (third steering assist torque) has a faster response than the steering assist torque integral control component (first steering assist torque), which leads to a faster follow-up response and reduced overshoot. As a result, in a case where the driver grips and steers the steering wheel 1, the steering torque stably follows the target steering torque, thereby achieving smoother steering. In the present embodiment, as the configuration for achieving stability and followability, the case where the torque feedback calculation unit 23 that performs torque feedback is provided has been described as an example. However, the configuration is not limited to the configuration in which the torque feedback is performed as long as the deviation between the target steering torque and the steering torque can be fed back.

Next, the effects of the control unit 11 (steering control device) described above will be described. In the steering control device that sets the target steering torque according to a steering situation and controls the steering torque to follow the target steering torque, when the driver sets a steering feeling of a vehicle, a target steering force-angle characteristic is adapted so that the target steering torque has a desired characteristic. As a specific adaptation method, a steering method is assumed in which the steering wheel 1 is operated with a sine wave at about 0.2 [Hz] at a vehicle speed to be adapted such that a lateral acceleration is 0.2 [G] or less.

In the technology disclosed in Patent Document 1 described above, in a case of setting the target steering force-angle characteristic to achieve a desired feeling, a steering force characteristics model decomposed into a spring component (base torque), a viscosity component (damper torque), and a friction component (friction torque) is used. In addition, in the technology disclosed in Patent Document 1 described above, the target steering torque can be set based on a plurality of center feel evaluation indexes that define a center feeling. However, in a case where an on-center feeling characteristic near a neutral steering angle is adjusted by the steering force characteristics model, there is a concern that characteristics in the other steering angle ranges are affected.

Figure 12:
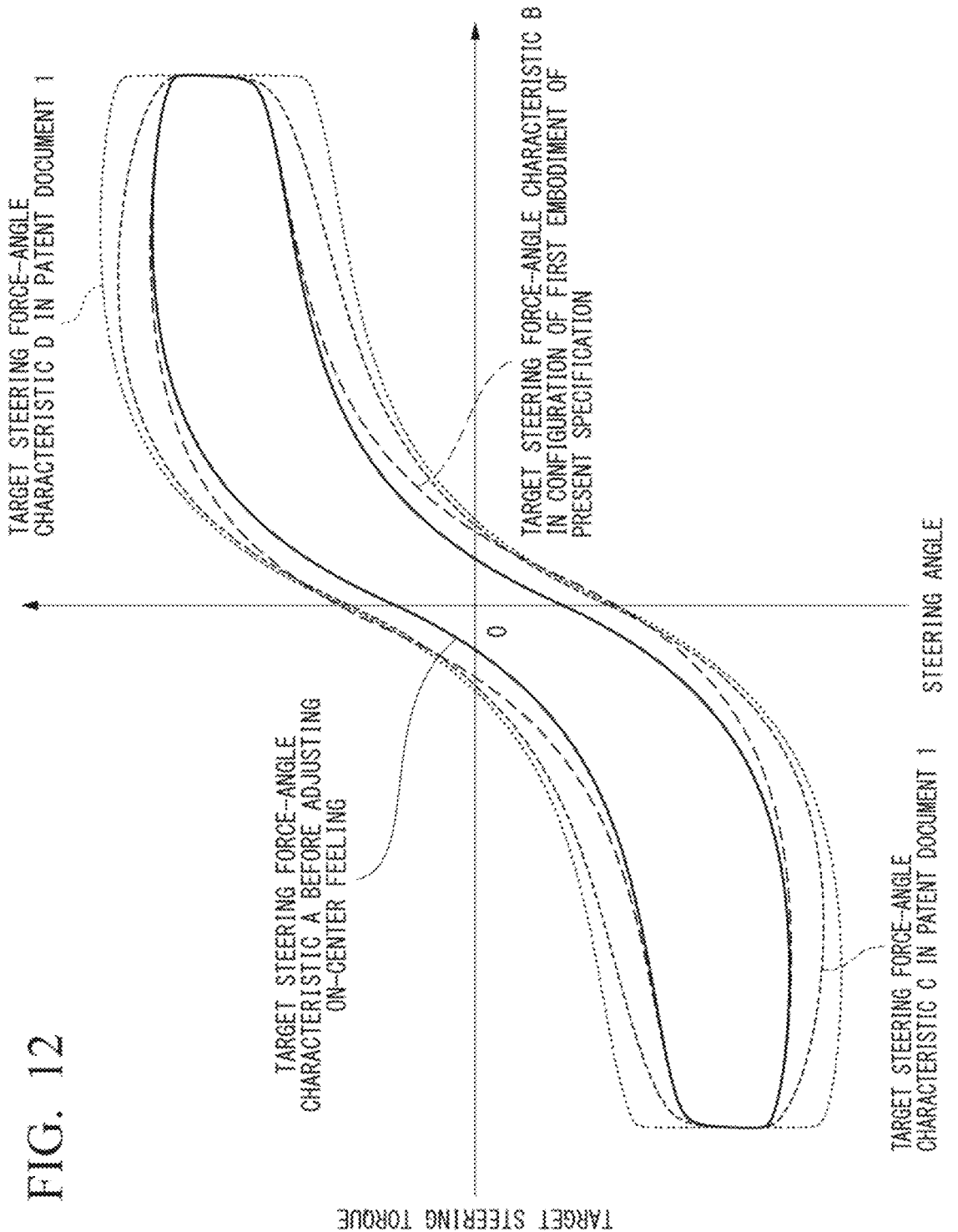
FIG. 12 is a diagram showing a relationship between a steering angle and a target steering torque when a steering wheel is steered in the first embodiment of the present disclosure.

FIG. 12 is a diagram showing a relationship between the steering angle and the target steering torque when the steering wheel is steered in the first embodiment of the present disclosure. A target steering force-angle characteristic A in FIG. 12 is a basic characteristic created by adding a base torque, a damper torque, and a friction torque. A target steering force-angle characteristic B in FIG. 12 is a characteristic in the present embodiment in which the on-center feeling characteristic is imparted to the target steering force-angle characteristic A.

A target steering force-angle characteristic C is a characteristic in the technology disclosed in Patent Document 1, in which the same on-center feeling characteristic as the target steering force-angle characteristic B is adjusted and imparted to the target steering force-angle characteristic A by a viscosity component. A target steering force-angle characteristic D is a characteristic in the technology disclosed in Patent Document 1, in which the same on-center feeling characteristic as the target steering force-angle characteristic B is adjusted and imparted to the target steering force-angle characteristic A by a friction component.

As shown in FIG. 12, in a case where the on-center feeling is to be imparted by the viscosity component or the friction component, the target steering force-angle characteristic is significantly changed from the initially set basic target steering force-angle characteristic A. Therefore, re-adaptation is required for all of the base torque, the damper torque, and the friction torque.

Figure 13:
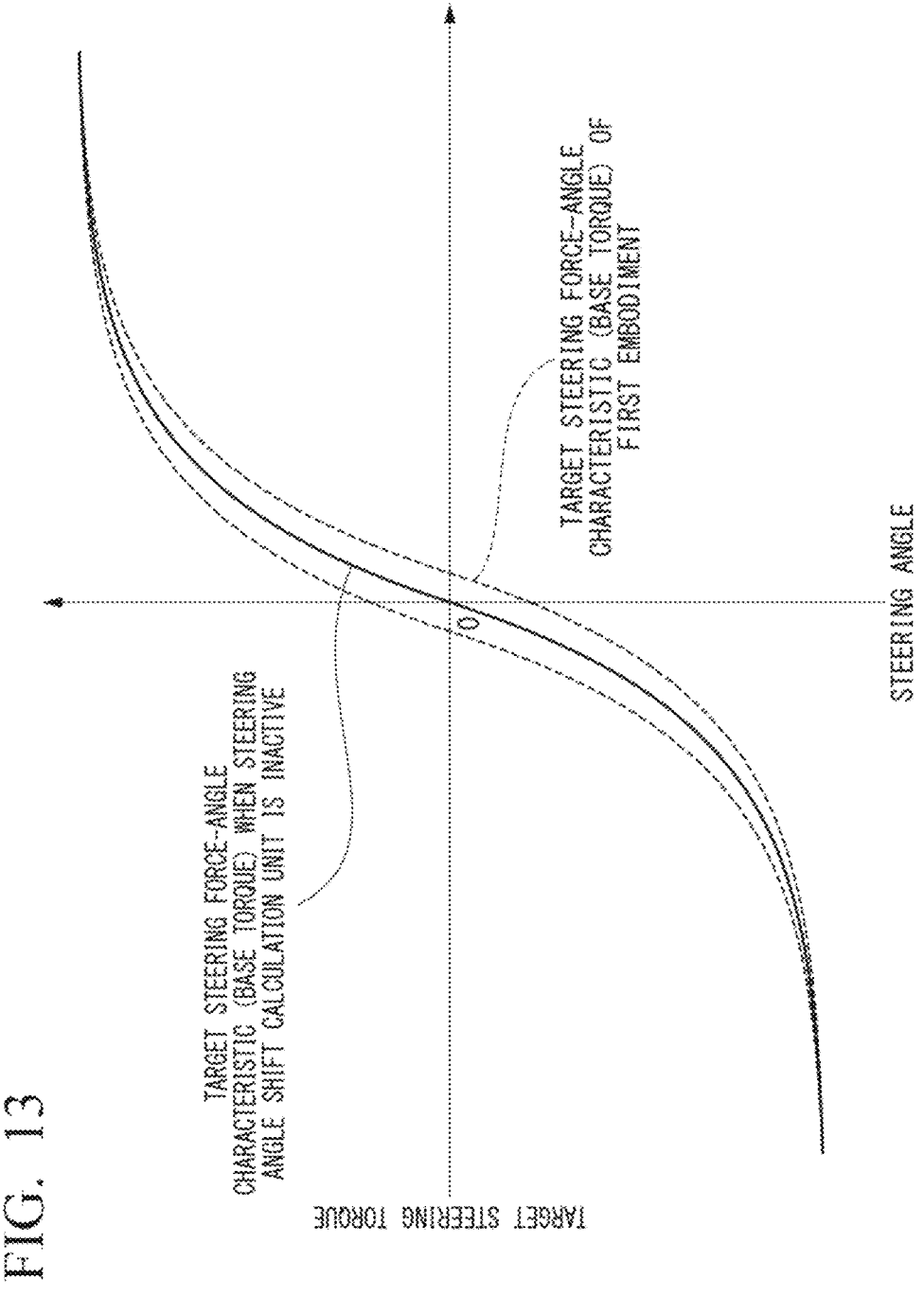
FIG. 13 is a diagram showing a relationship between the steering angle and the target steering torque (base torque) when the steering wheel is steered in the first embodiment of the present disclosure.

FIG. 13 is a diagram showing a relationship between the steering angle and the target steering torque (base torque) when the steering wheel is steered in the first embodiment of the present disclosure. In the control unit 11 according to the present embodiment, in a case where the steering is performed with a sine wave as in the adaptation method, a peak of the motor rotation angular velocity appears near a neutral position. Therefore, as shown in FIG. 13, in a case where the steering angle shift calculation unit 26 is active, a torque can be applied to be specialized for about a neutral point of the base torque (first torque), and thus the on-center feeling can be adjusted.

Figure 14:
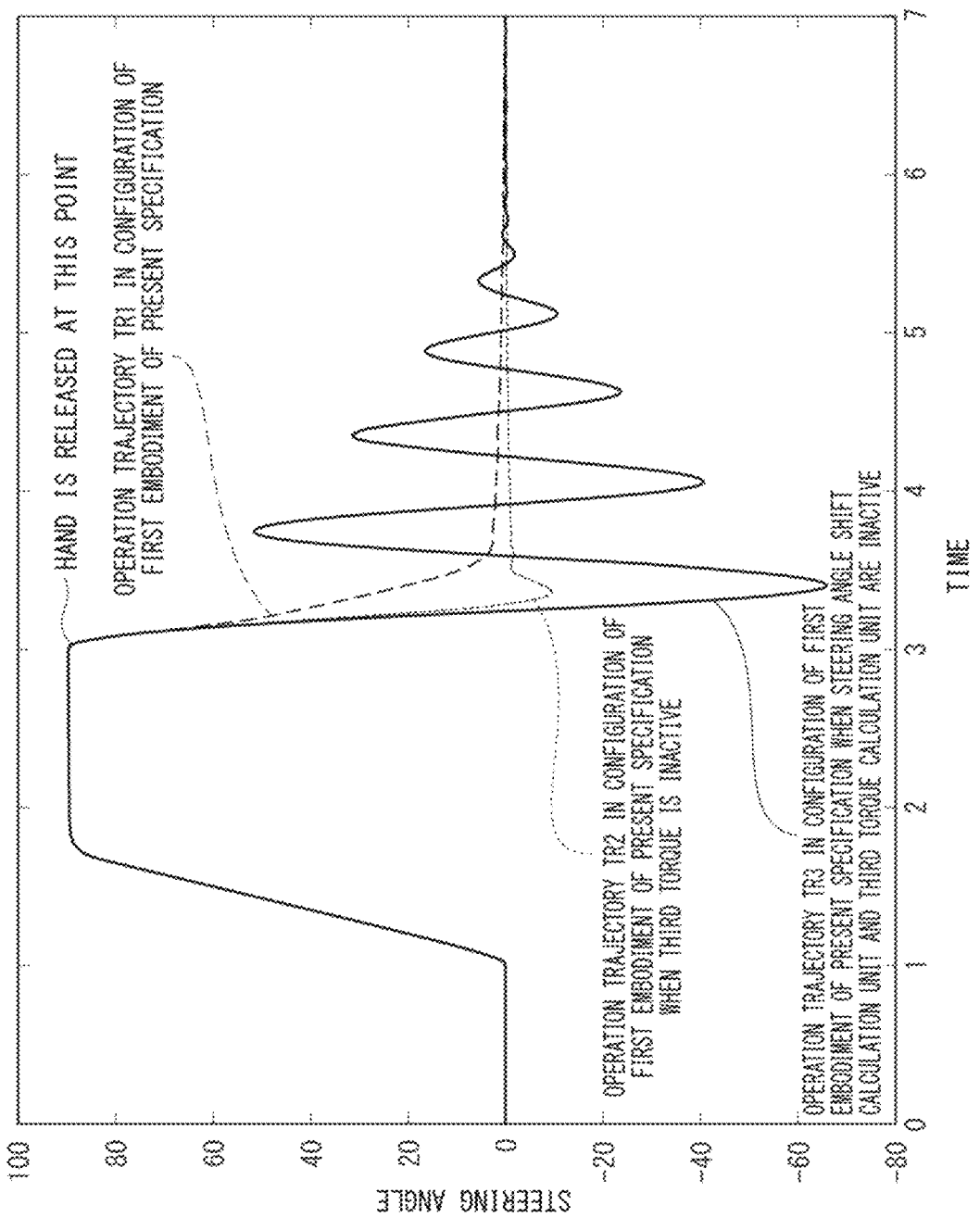

FIG. 14 shows an operation trajectory of the steering angle in a case where the driver releases the steering wheel after cutting in. An operation trajectory TR1 is obtained in the present embodiment. An operation trajectory TR2 is obtained in a case where the third torque calculation unit 29 is inactive. An operation trajectory TR3 is obtained in a case where the steering angle shift calculation unit 26 and the third torque calculation unit 29 are inactive. Referring to FIG. 14, in the present embodiment, by providing the steering angle shift calculation unit 26 and the third torque calculation unit 29, a behavior of the steering wheel 1 can be suppressed, and high convergence can be achieved. As a result, the steering wheel 1 can be converged without causing overshoot and oscillation.

Furthermore, in the present embodiment, the steering angle shift gain Dg of the steering angle shift calculation unit 26, the base map 27a of the base calculation unit 27 that is used to obtain the first torque, the second torque calculation unit 28 that is used to obtain the second torque, and the damper gain map 29a of the third torque calculation unit 29 that is used to obtain the third torque are variable with respect to the vehicle speed. Accordingly, it is possible to set an appropriate control gain in response to characteristics of a road surface reaction torque that varies with the vehicle speed, and it is possible to flexibly set the target steering torque according to the vehicle speed, whereby it is possible to achieve a wide variety of steering feelings. It should be noted that all the gains do not need to be variable with respect to the vehicle speed, and at least one gain or map may be variable with respect to the vehicle speed.

In addition, in the present embodiment, the steering angle sensor 4 is provided in the steering state detection unit 21, and the steering angle detected by the steering angle sensor 4 is used in the steering angle shift calculation unit 26. However, instead of the detection result of the steering angle sensor 4, a steering angle into which the motor rotation angle detected by the motor rotation angle sensor 10 is converted may be used. For example, an angle of the steering shaft 2 into which the motor rotation angle detected by the motor rotation angle sensor 10 is converted using a reduction ratio of the reduction gear 7 may be used. Furthermore, in a case where the motor rotation angle is an angle relative to the angle of the steering shaft 2, a yaw rate sensor or the like (not shown) provided in the vehicle may be used to determine straight-ahead travel, the motor rotation angle may be offset to cause the relative angle to become zero and may be used as the absolute angle of the steering shaft 2.

Second Embodiment

<Electric Power Steering Device>

A configuration of an electric power steering device according to the present embodiment is basically the same as the configuration of the electric power steering device PS shown in FIG. 1. Therefore, a detailed description of the electric power steering device according to the present embodiment will be omitted.

<Steering Control Device>

A basic configuration of a steering control device according to the present embodiment is the same as that of the steering control device (control unit 11) according to the first embodiment. However, there is a difference in the configuration of the steering angle shift calculation unit 26 of the first torque calculation unit 25 provided in the target torque setting unit 22 of the control unit 11. Hereinafter, the steering angle shift calculation unit 26 will be described.

Figure 15:
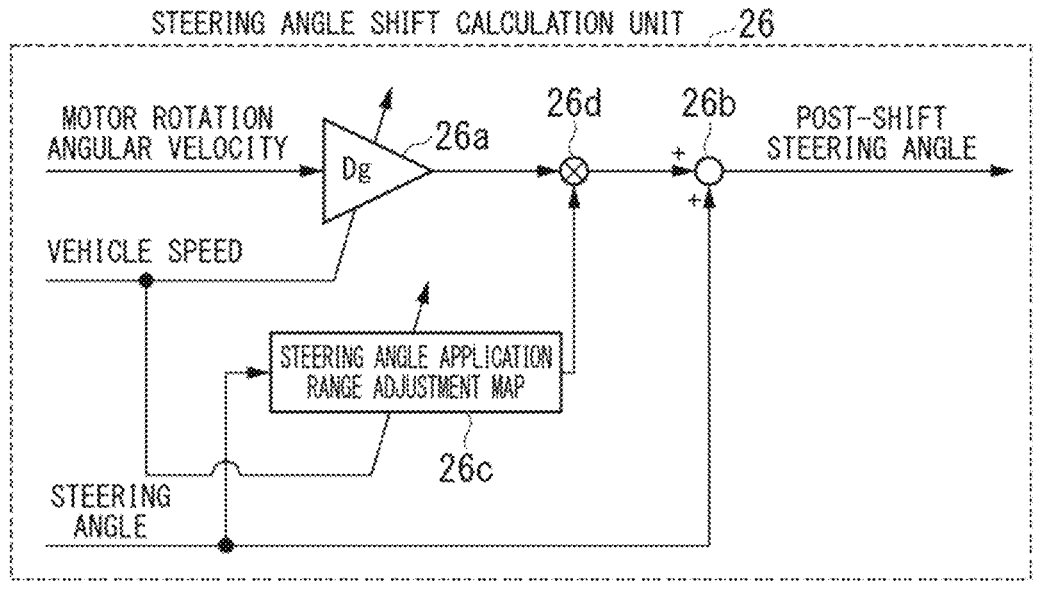
FIG. 15 is a block diagram showing a configuration of a steering angle shift calculation unit in a second embodiment of the present disclosure.

FIG. 15 is a block diagram showing the configuration of the steering angle shift calculation unit in the second embodiment of the present disclosure. As shown in FIG. 15, a steering angle shift calculation unit 26 according to the present embodiment has a configuration in which a steering angle application range adjustment map 26c and a multiplier 26d are added to the steering angle shift calculation unit 26 shown in FIG. 4. The steering angle shift calculation unit 26 shown in FIG. 4 and the steering angle shift calculation unit 26 in the present embodiment shown in FIG. 15 are different from each other in a method of calculating the first shift amount, which is the shift amount of the steering angle of the steering wheel 1.

Figure 16:
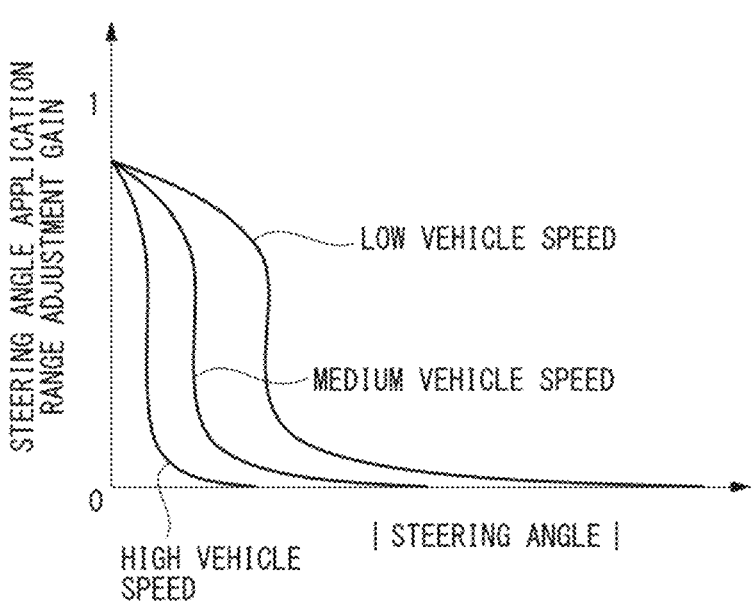
FIG. 16 is a diagram showing an example of a steering angle application range adjustment map used in the steering angle shift calculation unit in the second 25 embodiment of the present disclosure.

FIG. 16 is a diagram showing an example of the steering angle application range adjustment map used in the steering angle shift calculation unit in the second embodiment of the present disclosure. The steering angle application range adjustment map 26c shown in FIG. 16 shows a characteristic of gradually decreasing a steering angle application range adjustment gain as the magnitude (absolute value) of the steering angle of the steering wheel 1 increases.

In addition, the steering angle application range adjustment map 26c is prepared to be different for each vehicle speed. In the example shown in FIG. 16, different steering angle application range adjustment maps 26c are prepared for each of "low vehicle speed", "medium vehicle speed", and "high vehicle speed". In a case where the steering angle application range adjustment map 26c is prepared, the steering angle application range adjustment map 26c in the first torque calculation unit 25 is changed according to the vehicle speed. However, the steering angle application range adjustment map 26c does not necessarily need to be prepared to be different for each vehicle speed.

The multiplier 26d multiplies the first shift amount output from the multiplier 26a by the steering angle application range adjustment gain obtained by using the steering angle application range adjustment map 26c to calculate a second shift amount, which is the shift amount of the steering angle after steering angle application range adjustment.

In the steering angle shift calculation unit 26, the steering angle shift gain Dg is specified according to the input vehicle speed, and the specified steering angle shift gain Dg and the motor rotation angular velocity are multiplied by the multiplier 26a to calculate the first shift amount (the shift amount of the steering angle of the steering wheel 1). In addition, one steering angle application range adjustment map 26c is specified according to the input vehicle speed, and the steering angle application range adjustment gain is obtained by using the input steering angle and the specified steering angle application range adjustment map 26c. The first shift amount and the steering angle application range adjustment gain are multiplied by the multiplier 26d to calculate the second shift amount (the shift amount of the steering angle after the steering angle application range adjustment). Moreover, the post-shift steering angle is calculated by adding the second shift amount to the steering angle by the adder 26b.

Figure 17:
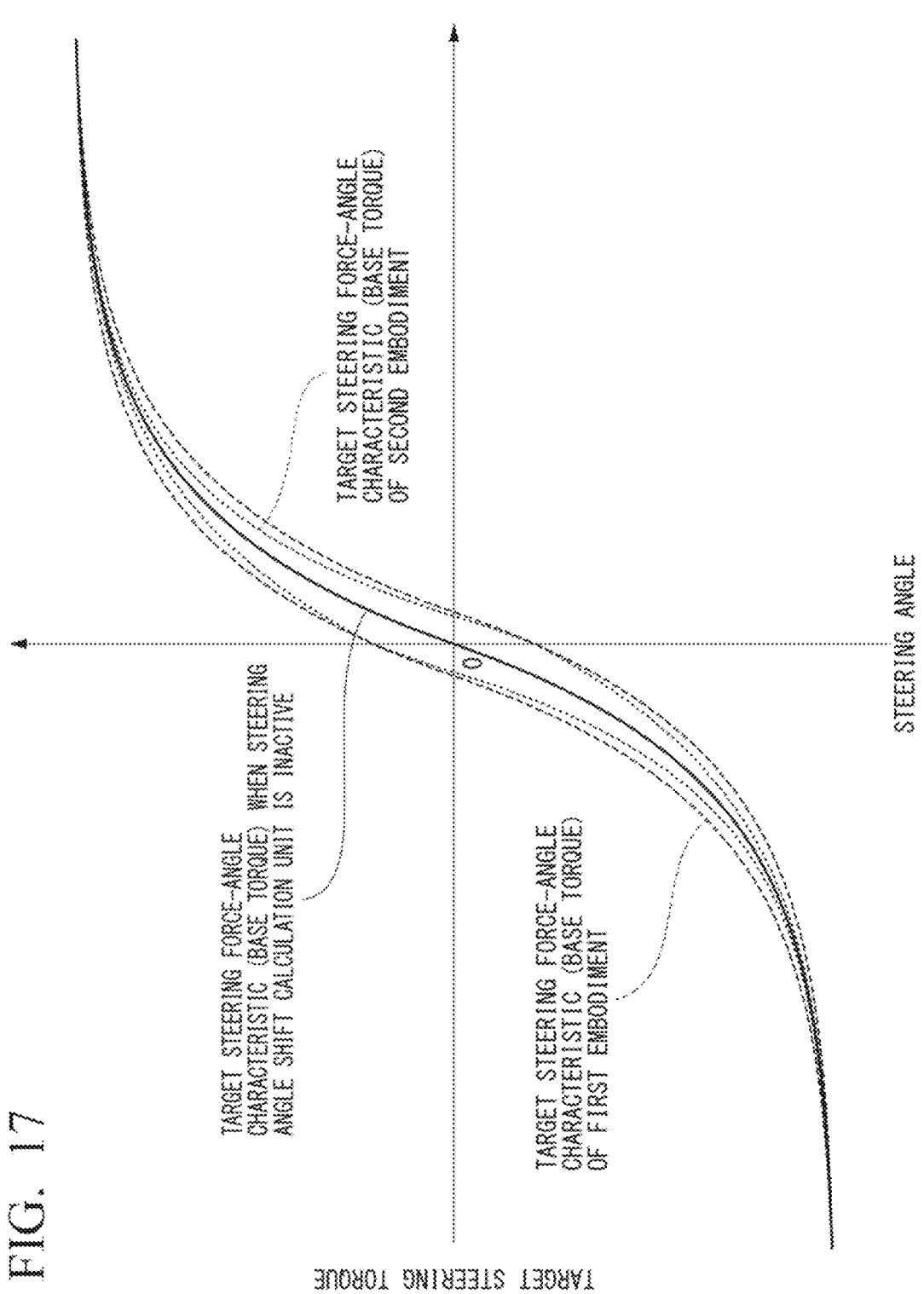
FIG. 17 is a diagram showing a relationship between the steering angle and the target steering torque (base torque) when the steering wheel is steered in the second embodiment of the present disclosure.

FIG. 17 is a diagram showing a relationship between the steering angle and the target steering torque (base torque) when the steering wheel is steered in the second embodiment of the present disclosure. In the present embodiment, by providing the steering angle application range adjustment map 26c, the post-shift steering angle can be gradually decreased with an increase in the steering angle. Therefore, as shown in FIG. 17, in the present embodiment, a range of an effect of the steering angle shift calculation unit imparted to the on-center feeling can be narrowed down to a more limited range than that in the first embodiment. Accordingly, it is possible to suppress an influence on the steering force-angle characteristic adjusted with an intention different from the intention of adjusting the on-center feeling characteristic.

Although the embodiments of the present disclosure have been described above, the present disclosure is not limited to the above-described embodiments, and may be freely modified without departing from the gist of the present disclosure. For example, the electric power steering device PS described in the above-described embodiment may be of a column type or may be of a rack-and-pinion type. In addition, the feedback control based on the target steering torque can be applied to a steer-by-wire reaction force unit or the like including at least a torque sensor. In addition, the drawings used in the description of the above-described embodiments are exemplary examples, and the present disclosure is not limited thereto.

It should be noted that each configuration (the target steering torque setting unit 22 and the torque feedback calculation unit 23) provided in the control unit 11 described above has an internal computer system. Moreover, a program for implementing functions of each configuration provided by the control unit 11 described above may be recorded on a computer-readable recording medium, and by having the computer system read and execute the program recorded on this recording medium, the processing in each configuration provided in the control unit 11 described above may be performed. Here, "having the computer system read and execute the program recorded on the recording medium" includes installing the program on the computer system. Here, the "computer system" mentioned here includes an operating system (OS) and hardware such as a peripheral device.

In addition, the "computer system" may include a plurality of computer devices connected via a network including a communication line such as the Internet, a WAN, a LAN, and a dedicated line. In addition, the "computer-readable recording medium" refers to a portable medium such as a flexible disk, a magneto-optical disk, a ROM, or a CD-ROM, and a storage device such as a hard disk built in a computer system. As described above, the recording medium on which the program is stored may be a non-transitory recording medium such as a CD-ROM.

In addition, the recording medium also includes an internal or external recording medium that is accessible by a distribution server to distribute the program. In addition, a configuration may be adopted in which the program is divided into a plurality of programs and the plurality of programs are downloaded at different times and then combined in each configuration provided in the control unit 11, or the distribution server that distributes each of the divided programs may be different. Furthermore, the "computer-readable recording medium" also includes a medium that holds the program for a certain period of time, such as a volatile memory (RAM) inside the computer system that serves as a server or a client in a case where the program is transmitted via a network. In addition, the program may be a program for implementing some of the functions described above. Furthermore, the program may be a so-called difference file (difference program) capable of implementing the functions described above in combination with a program that has already been recorded on the computer system.

REFERENCE SIGNS LIST

1: Steering wheel
2: Steering shaft
5: Torque sensor
6: Motor
11: Control unit
12: Current drive unit
21: Steering state detection unit
22: Target steering torque setting unit
23: Torque feedback calculation unit
24: Motor rotation angular velocity detection unit
25: First torque calculation unit
26: Steering angle shift calculation unit
26c: Steering angle application range adjustment map
27: Base calculation unit
28: Second torque calculation unit
29: Third torque calculation unit
29a: Damper gain map
29c: Damper torque map
30: Target steering torque calculation unit
PS: Electric power steering device
The invention claimed is:

1. A steering control device comprising:
a target steering torque setting circuitry configured to set a target steering torque for steering;
a calculation circuitry configured to calculate, based on a deviation between the target steering torque and a steering torque acting on a steering shaft of the steering, a steering assist torque necessary for causing the steering torque to follow the target steering torque; and
a current drive circuitry configured to control a current flowing to a motor to generate the steering assist torque for the steering,
wherein the target steering torque setting circuitry includes
a first torque calculation circuitry configured to calculate
a first shift amount, which is a shift amount of a steering angle of a steering wheel, by multiplying a rotation angular velocity of the motor by a steering angle gain, and to obtain a first torque based on a post-shift steering angle obtained by adding the first shift amount to the steering angle and a base map showing a characteristic of gradually increasing a magnitude of a base torque as a magnitude of the post-shift steering angle increases, a second torque calculation circuitry configured to obtain a second torque for imparting hysteresis to the target steering torque by using the rotation angular velocity of the motor, and a target steering torque calculation circuitry configured to add the first torque and the second torque to be output as the target steering torque.

2. The steering control device according to claim 1, wherein the first torque calculation circuitry includes a steering angle shift calculation circuitry configured to calculate the post-shift steering angle, and a base calculation circuitry configured to obtain the first torque based on the post-shift steering angle and the base map.

3. The steering control device according to claim 2, wherein the steering angle shift calculation circuitry further includes a steering angle application range adjustment map in which a steering angle application range adjustment gain is defined according to the steering angle, and calculates a second shift amount, which is a shift amount of the steering angle after steering angle application range adjustment, by multiplying the steering angle application range adjustment gain according to the steering angle obtained from the steering angle application range adjustment map by the first shift amount, and calculates the post-shift steering angle by adding the steering angle to the second shift amount.

4. The steering control device according to claim 3, wherein the steering angle application range adjustment map is a map showing a characteristic of gradually decreasing the steering angle application range adjustment gain as a magnitude of the steering angle increases.

5. The steering control device according to claim 3, wherein the first torque calculation circuitry changes at least one of the steering angle gain, the base map, and the steering angle application range adjustment map according to a vehicle speed of a vehicle.

6. The steering control device according to claim 1, wherein the second torque calculation circuitry obtains the second torque by using the rotation angular velocity of the motor and a hysteresis gain defined for each vehicle speed of a vehicle.

7. The steering control device according to claim 1, wherein the target steering torque setting circuitry further includes a third torque calculation circuitry configured to obtain a third torque as a damper torque based on the rotation angular velocity of the motor, and the target steering torque calculation circuitry adds the first torque, the second torque, and the third torque to be output as the target steering torque.

8. The steering control device according to claim 7, wherein the third torque calculation circuitry further includes a damper gain map in which a damper gain is defined according to the rotation angular velocity of the motor, and specifies the damper gain according to the rotation angular velocity of the motor by using the damper gain map, and obtains a third torque by multiplying the specified damper gain by the rotation angular velocity of the motor.

9. The steering control device according to claim 8, wherein the third torque calculation circuitry changes the damper gain map according to a vehicle speed of a vehicle.

10. The steering control device according to claim 7, wherein the third torque calculation circuitry further includes a damper torque map in which the damper torque is defined according to the rotation angular velocity of the motor, and obtains the third torque based on the rotation angular velocity of the motor and the damper torque map.

11. The steering control device according to claim 10, wherein the third torque calculation circuitry changes the damper torque map according to a vehicle speed of a vehicle.

12. An electric power steering device comprising:

a steering torque detection circuitry configured to detect a steering torque acting on a steering shaft of steering;

a steering state detection circuitry configured to detect a steering angle of a steering wheel;

a motor configured to apply a steering assist torque to the steering shaft;

a motor rotation angular velocity detection circuitry configured to detect a rotation angular velocity of the motor; and the steering control device according to claim 1, configured to control drive of the motor based on the detected steering torque, the detected steering angle, and the detected rotation angular velocity of the motor.

* * * * *